United States Patent Office 3,157,629
Patented Nov. 17, 1964

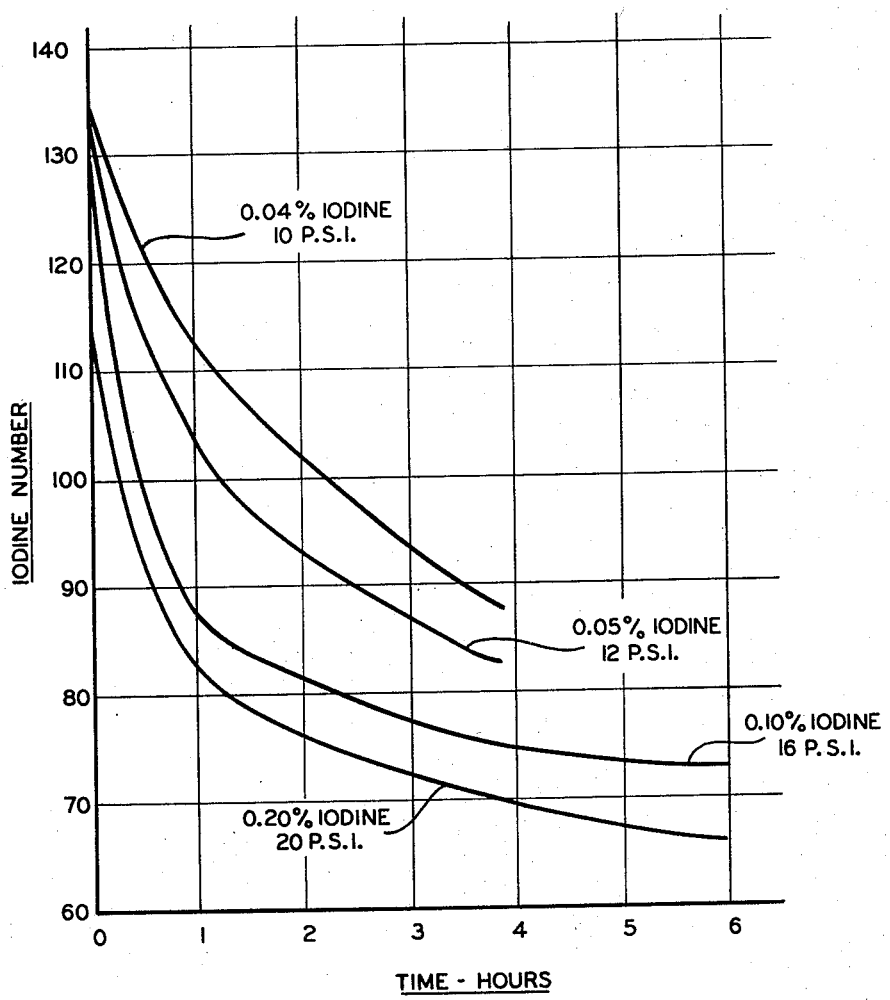

3,157,629
TREATMENT OF TALL OIL FATTY ACIDS
Paul D. Patrick, Jr., South Windermere, Charleston, S.C., assignor to West Virginia Pulp and Paper Company, New York, N.Y., a corporation of Delaware
Filed Feb. 13, 1959, Ser. No. 793,172
3 Claims. (Cl. 260—97.5)

My present invention relates to the conversion or modification of tall oil fatty acids to yield more useful products, and to such products themselves, especially those finding application as starting material for the manufacture of detergents and for protective coatings and plastics. Tall oil fatty acids normally consist of a major portion of monounsaturated oleic acids and diunsaturated linoleic acids (in approximately equal proportions) and small quantities of triunsaturated linolenic acids, saturated acids, and unsaponifiables. Also since tall oil fatty acids are derived from tall oil, which contains substantial quantities of rosin acids, small quantities of the latter may also be present. The Bureau of the Census of the U.S. Department of Commerce has accepted the definition of "tall oil fatty acids" as that material produced from crude tall oil which contains 90% or more free fatty acids excluding rosin acids. Most commercially available tall oil fatty acids contain substantialy more than 90% fatty acids and substantially less than 10% rosin acids. In the tall oil fatty acids which are the subject of this application, the maximum quantity of rosin acids is 10%. The following is an analysis of a typical tall oil fatty acid.

| | Percent |
|---|---|
| Saturated acids | 3 |
| Oleic acids | 47 |
| Linoleic acids | 40 |
| Linolenic acids | 5 |
| Unsaponifiables | 1 |
| Rosin acids | 4 |
| | 100 |

In the effort to employ tall oil fatty acids as starting materials for the manufacture of detergents, as by sulfonation for example, the large amount of polyunsaturated linoleic acids and linolenic acids in the tall oil fatty acids is found to be detrimental since they give rise to side reactions with the formation of undesirable products, and therefore have not found wide acceptance for such use.

I have now discovered that surprisingly, it is possible to decrease the amount of unsaturation of the tall oil fatty acids through partial hydrogenation and dimerization of tall oil fatty acids, containing only small quantities of rosin acids, simply by heating the tall oil fatty acids, preferably under pressure, in the presence of an iodine catalyst to within a temperature range of 450–550° F. Thereby substantial dimerization of unsaturated fatty acids is caused to occur with the generation of hydrogen resulting in the conversion of substantial quantities of the linolenic acids and linoleic acids to more saturated acids, primarily oleic acids. When, on the other hand, it is attempted to carry out the reaction in the presence of large quantities of rosin acids, the disproportionation of these rosin acids is accompanied by the generation of substantial quantities of hydrogen, resulting in the hydrogenation of the unsaturated fatty acids. This hydrogenation interferes with the dimerization of the unsaturated fatty acids with the consequent diminution of yield thereof, and loss of a valuable feature of this invention. While it is desirable to use tall oil fatty acids containing as small a quantity of rosin acids as possible, rosin acid contents of not more than 10% can advantageously be used in the practice of this invention.

My invention as above outlined is to be distinguished from processes for disproportionating tall oil as such, as for example those set forth in the patent to Floyd, 2,617,792, and that to Hasselstrom, 2,311,386. In such processes, the tall oil started with contains a relatively large proportion of rosin acids, and is subjected to heat in the presence of a catalyst, whereupon hydrogen is generated largely from the rosin acids, especially those coming under the designation "abietic acid" and serves to hydrogenate the other rosin acids, and the unsaturated fatty acids as well. This reaction above referred to is known as disproportionation and yields a product in which the polyunsaturated fatty acids originally present are hydrogenated. Because of the relatively large amount of hydrogen generated, however, the reaction produces little or no dimerization of the unsaturated fatty acids for the reasons mentioned hereinabove. Thus Floyd for example, in column 3, beginning line 20, states that to carry out the disproportionation reaction requires a minimum of about 30% of rosin acids. In the disproportionation process covered by the Hasselstrom patent above cited, substantially the same results are sought for as in the Floyd patent. While Hasselstrom in Example 4 uses a fatty acid mixture having a reduced quantity of what he terms resin acids including Steele's abietic acid, he gives no indication of reaching applicant's result as indeed he could not, since assuming that he starts with a material of less than 10% of rosin acids— which is highly doubtful—his maximum temperature of treatment of 200° C. (392° F) is insufficient to bring about applicant's result.

Therefore, the rosin acids must be kept preferably at a minimum, and not over 10%, in order not to inhibit the formation of dimers; further, when it is desired to use the product of my invention in the manufacture of detergents, it is found that the presence of an appreciable amount of rosin acids is objectionable because the soaps formed therefrom are extremely difficult to wash out of the fabrics, and because in some instances they are irritating to the skin.

In carrying out my invention, iodine may be used in concentrations as low as 0.01% of the tall oil fatty acids. At lower concentrations of iodine the conversion of the polyunsaturated acids proceeds at a rate too slow for practical use. As the amount of iodine catalyst is increased, the rate at which conversion of the polyunsaturated acids occurs is also increased. Certain advantages are to be had however, by the use of low concentrations of iodine, i.e., from 0.01 to 0.05%. One of these advantages is that a bleaching effect occurs resulting in the production of a product 1 to 2 degrees lighter on the Gardner color scale. Also, low concentrations of iodine do not force the reaction to proceed so far that large amounts of saturated acids are formed, whereas the use of high concentrations of iodine, 1 to 2%, results in the formation of substantial quantities of saturated acids.

It is also possible according to this invention, to produce from tall oil fatty acids having an iodine value of 135, products having an iodine value of 90 (roughly equivalent to that of commercial grades of oleic acids), in as sort a time as 10 to 15 minutes, using a high concentration of iodine of about 2%.

Using 0.04% iodine, approximately three hours would be required to result in the same decrease in unsaturation.

Distillation under vacuum of the products produced by the heating of the tall oil fatty acids with iodine permits easy separation of the fatty acids from the dimerized acids. The fatty acids fraction having a high concentration of oleic acid therein can be used in most applications where commercial grades of oleic acids are employed.

The dimerized acids find wide use in plastics and coating applications.

The single figure of the drawing consists of four graphs of results when employing the improved method on a representative tall oil fatty acid sample, as for example, that shown in Example I using a temp. of 500° F., the same being plotted with iodine numbers of the product as ordinates, and time in hours as abscissae, illustrating the effect of varying amounts of iodine. In these runs pressure was used, as shown.

My invention will be best understood by reference to the accompanying drawing and specific examples, and the elements of novelty will be pointed out in the appended claims.

In carrying out my invention, superior results are to be had by the use of pressure in the cooking operation; for example, the same degree of conversion can be obtained by using 0.05% iodine with 12 p.s.i. pressure as can be obtained by using 0.2% iodine with no pressure. Also, unless pressure is used, complete conversion of the linoleic and linolenic acids cannot be accomplished. Thus, the optimum pressure to be used is dependent upon the amount of iodine catalyst used. At concentrations of 0.2% and 1% iodine, 20 and 30 p.s.i. pressure, respectively, may be used effectively. Depending upon the amount of iodine catalyst used, the temperature and the pressure, the time of treatment will ordinarily vary from 10 minutes to 6 hours.

As above stated, temperatures between 450 and 550° F. may be satisfactorily used. Above 550° F. side reactions occur to such a large degree that a uniform product is not obtained; below 450° F. the in situ hydrogenation occurs at too slow a rate to be of practical use. The optimum temperature may be taken as approximately 500° F. at which the linolenic and linoleic acids are converted almost as rapidly as at the higher temperatures but without discernible side reactions.

Example I

The starting material for this example was a tall oil fatty acid having the following composition:

|  | Percent |
|---|---|
| Rosin acids | Less than 0.5 |
| Linoleic acids | 47.0 |
| Oleic acids | 49.0 |
| Saturated acids | 2.0 |
| Unsaponifiables | 1.0 |
|  | 99+ |

The refractive index at 50° C. of this material was 1.4609.

This fatty acid material was heated to 500° F. at 12 p.s.i. in the presence of 0.05% iodine catalyst. After maintaining the temperature at 500° F. for 5 hours the composition of the mixture which had an iodine value of 82 was in part as follows:

|  | Percent |
|---|---|
| Linoleic | 8.8 |
| Saturated acids | 2.8 |
| Unsaponifiables | 2.5 |

The remaining 85.9% consists of oleic and dimerized acids which could not be distinguished except by distillation.

Upon distillation of the total heated material at 0.8 mm. vacuum, the following fractions were obtained:

|  | Percent Yield | Percent Saturated Acids | Percent Oleic Acids | Percent Linoleic Acids | Percent Unsaponifiables | Percent Dimerized Acids |
|---|---|---|---|---|---|---|
| Heads | 3.2 | 8.1 | 71.4 | 5.3 | 15.2 |  |
| Distillate | 72.2 | 2.8 | 86.0 | 8.9 | 2.3 |  |
| Residue | 24.1 | 0.0 |  | 6.5 | 1.6 | 91.9 |

The index of refraction at 50° C. for the residue was 1.6790 and for the distillate 1.4543.

Example II

The starting material for this example was the same as for Example I and was heated under identical conditions except that 0.2% iodine and 20 p.s.i. pressure was used.

After heating, the fatty acids which had an iodine value of approximately 68 had the following composition:

|  | Percent |
|---|---|
| Linoleic acids | 2.4 |
| Saturated acids | 17.7 |
| Unsaponifiables | 1.6 |

The remaining 78.3% consisted of oleic and dimerized acids.

Distillation of the total treated fatty acids yielded the following products:

|  | Percent Yield | Percent Saturated Acids | Percent Oleic Acids | Percent Linoleic Acids | Percent Dimerized Acids | Percent Unsaponifiables |
|---|---|---|---|---|---|---|
| Heads | 8.1 | 2.2 | 79.8 | 3.3 |  | 14.7 |
| Distillate | 68.5 | 25.5 | 71.7 | 1.5 |  | 1.3 |
| Residue | 23.4 | 0.0 |  | 6.3 | 92.4 | 1.3 |

Example III

The starting material and conditions for this example as for Examples I and II except that 1.0% iodine was used as the catalyst and heating was done under a pressure of 30 p.s.i. The material obtained after the heating had an iodine value of 60 and following composition:

|  | Percent |
|---|---|
| Linoleic acids | 5.1 |
| Saturated acids | 16.5 |
| Unsaponifiables | 4.0 |

The remaining 74.4% consisted of a mixture of oleic and dimerized acids.

Distillation of the total material obtained on heating yielded fractions with the following compositions:

|  | Percent Yield | Percent Saturated Acids | Percent Oleic Acids | Percent Linoleic Acids | Percent Dimerized Acids | Percent Unsaponifiables |
|---|---|---|---|---|---|---|
| Heads | 2.5 | 5.6 | 62.2 | 6.9 |  | 25.3 |
| Distillate | 71.8 | 22.8 | 70.8 | 2.2 |  | 4.2 |
| Residue | 22.2 | 0.0 |  | 14.0 | 81.1 | 4.9 |

Example IV

The starting material for this example had the following composition:

| | Percent |
|---|---|
| Rosin acids | 4.1 |
| Unsaponifiables | 2.4 |
| Linoleic acids | 39.4 |
| Oleic acids | 47.8 |
| Saturated acids | 4.7 |

These fatty acids were heated at 500° F. for 3 hours at 20 p.s.i. in the presence of 0.2% iodine. The resultant material had a Gardner color of 15–17 and an iodine value of 72. The composition of this material was as follows:

| | Percent |
|---|---|
| Rosin acids | 5.1 |
| Unsaponifiables | 2.0 |
| Linoleic acids | 1.9 |
| Saturated acids | 5.3 |
| Oleic and dimerized acids | 84.5 |
| | 98.8 |

The distillate from this material had a color of 3–4 Gardner and an iodine value of 81 and had the following composition:

| | Percent |
|---|---|
| Rosin acids | 6.8 |
| Unsaponifiables | 3.6 |
| Linoleic acids | 3.8 |
| Oleic acids | 72.2 |
| Saturated acids | 5.0 |
| | 91.4 |

Example V

The starting material for this example contained a higher rosin acid content than that for Example IV. The iodine value of this material was 135. This material was heated at 500° F. for 5 hours in the presence of 0.2% iodine at 20 p.s.i. pressure. The compositions of the starting material and the material after heating are as follows:

| | Original, Percent | After Heating, Percent |
|---|---|---|
| Rosin acids | 6.8 | 4.2 |
| Unsaponifiables | 2.4 | 3.1 |
| Linoleic acids | 40.2 | 3.4 |
| Oleic acids | 45.9 | |
| Saturated acids | 4.7 | 14.5 |

The oleic acids and dimerized acids composed 74.9% of the acids after heating. The iodine value of the total material after heating was approximately 67.

Upon distillation of the total heated material, fractions with the following compositions were obtained:

| | Percent Yield | Percent Rosin Acids | Percent Unsaponifiables | Percent Saturated Acids | Percent Oleic Acids | Percent Linoleic Acids | Dimerized Acids |
|---|---|---|---|---|---|---|---|
| Heads | 7 | 6.0 | 19.7 | 4.9 | 72.1 | 3.3 | |
| Distillate | 73 | 3.6 | 2.9 | 19.4 | 71.9 | 2.2 | |
| Residue | 20 | 0.0 | 1.7 | 0.0 | | 7.7 | 90.6 |

Example VI

The starting material for this example had the following composition:

| | Percent |
|---|---|
| Rosin acids | 4.8 |
| Linolenic acids | 2.6 |
| Linoleic acids | 30.9 |
| Oleic acids | 47.3 |
| Saturated acids (palmitic and stearic) | 9.2 |
| | 94.8 |

This material was heated at approximately 500° F. for 45 minutes with 0.05% iodine under a pressure up to approximately 40 p.s.i. The resulting material which had a 90.5 iodine number had the following composition:

| | Percent |
|---|---|
| Rosin acids | 4.7 |
| Dimer acids | 2.9 |
| Linolenic acids | 0.6 |
| Linoleic acids | 12.8 |
| Oleic acids | 52.0 |
| Saturated acids (palmitic and stearic) | 8.6 |
| | 81.6 |

It should be noted that in this example and Example VII following, that the only $C_{16}$ palmitic and $C_{18}$ stearic acids are included in the saturated acids. Although some unsaponifiables are undoubtedly present, the majority of the remaining material is believed to be primarily $C_{19}$ and $C_{21}$ saturated acids.

Example VII

The starting material used in Example VI was heated at approximately 500° F. with 0.2% iodine for two hours under a pressure up to 40 p.s.i. The product had the following composition:

| | Percent |
|---|---|
| Rosin acids | 4.7 |
| Dimer acids | 16.6 |
| Linolenic acids | 0.7 |
| Linoleic acids | 3.5 |
| Oleic acids | 61.2 |
| Saturated acids (palmitic and stearic) | 7.9 |
| | 94.6 |

The iodine value of this oil was 79.

From these examples and the drawing it is apparent that a very wide range of products can be obtained in the practice of this invention by varying not only the time during which the tall oil fatty acids are heated, but also by varying the concentration of the iodine catalyst used. In general this invention contemplates a product having the following range of composition:

| | Percent |
|---|---|
| Rosin acids | Less than 10 |
| Saturated fatty acids | 2–20 |
| Oleic acids | 45–70 |
| Linoleic acids | 0–15 |
| Linolenic acids | Less than 2 |
| Dimerized acids | 2–25 |
| Unsaponifiables | Less than 5 |
| Iodine number | 60–110 |

For obtaining maximum quantities of dimerized acids and oleic acids iodine should be used at low concentrations, on the order of 0.01 to 0.1%. At these concentrations the conversion of the polyunsaturated acids to the dimerized acids and oleic acids is favored while at higher concentrations of iodine, the conversion of the polyunsaturated acids to saturated acids is promoted, greatly decreasing the quantity of dimerized acids and oleic acids obtained.

Dimerized acids fractions recoverable from the iodine treated tall oil fatty acids will generally fall within the following range of compositions:

| | Percent |
|---|---|
| Dimerized acids | 75–95 |
| Saturated and oleic acids | Less than 2 |
| Linoleic acids | 0–20 |
| Linolenic acids | Less than 2 |
| Rosin acids | Less than 10 |
| Unsaponifiables | Less than 5 |

Oleic acids fractions recoverable will generally have compositions within the following ranges:

| | Percent |
|---|---|
| Rosin acids | 0–10 |
| Saturated acids | 2–30 |
| Oleic acids | 70–90 |
| Linoleic acids | 1–10 |
| Linolenic acids | Less than 1 |
| Unsaponifiables | Less than 5 |

Various changes may be made in the examples specifically set forth without departing from the spirit of my invention or the scope of the appended claims.

I claim:

1. The method of treating a tall oil fatty acid product containing less than 10% rosin acids and substantial quantities of both linoleic and oleic acids which taken together constitute a major portion of the tall oil product, which consists of the step of heating said tall oil product at a temperature between 450 and 550° F. in the presence of iodine in an amount equal to between 0.01 and 2% of the weight of the tall oil for a period of time between 10 minutes and 6 hours sufficient to reduce the iodine value of the tall oil to between 60 and 110.

2. The method of claim 1 wherein the heating is carried out under a pressure between about 10 and 40 p.s.i.

3. The method of claim 1 wherein the quantity of iodine employed is between 0.01 and 0.05% of the weight of the tall oil fatty acids.

References Cited in the file of this patent

UNITED STATES PATENTS

| 2,311,386 | Hasselstrom | Feb. 16, 1943 |
| 2,794,017 | Palmer et al. | May 28, 1957 |